US008472520B2

(12) United States Patent
Banerjee

(10) Patent No.: US 8,472,520 B2
(45) Date of Patent: *Jun. 25, 2013

(54) SYSTEMS AND METHODS FOR TRANSMITTING AND RECEIVING DATA STREAMS WITH FEEDBACK INFORMATION OVER A LOSSY NETWORK

(76) Inventor: Debarag Banerjee, Sunnyvale, CA (US)

( * ) Notice: Subject to any disclaimer, the term of this patent is extended or adjusted under 35 U.S.C. 154(b) by 163 days.

This patent is subject to a terminal disclaimer.

(21) Appl. No.: 13/149,635

(22) Filed: May 31, 2011

(65) Prior Publication Data

US 2011/0228845 A1 Sep. 22, 2011

Related U.S. Application Data

(63) Continuation of application No. 12/511,963, filed on Jul. 29, 2009, now Pat. No. 7,974,233.

(51) Int. Cl.
*H04N 7/12* (2006.01)
(52) U.S. Cl.
USPC ................................ 375/240.12; 375/240.26
(58) Field of Classification Search
USPC .............. 375/240.25, 240.26, 240.12, 240.01
See application file for complete search history.

(56) References Cited

U.S. PATENT DOCUMENTS

| 7,447,906 B2 * | 11/2008 | Kubota ........................ 713/168 |
| 7,636,298 B2 | 12/2009 | Miura |
| 2005/0129058 A1 | 6/2005 | Casaccia et al. |
| 2007/0206673 A1 | 9/2007 | Cipolli et al. |
| 2008/0316362 A1 | 12/2008 | Qiu et al. |

FOREIGN PATENT DOCUMENTS

EP   1798926 A1   6/2007

OTHER PUBLICATIONS

Wiviu Technology Inc., PCT/US2010/042480 filed Jul. 19, 2010; International Search Report and Written Opinion; ISA/KR; mailed Feb. 21, 2011, 8 pages.

* cited by examiner

*Primary Examiner* — Chandrahas Patel
(74) *Attorney, Agent, or Firm* — Dentons US LLP

(57) ABSTRACT

Systems, apparatus, and methods are provided to enhance transmitting and receiving video data streams with feedback information over a lossy and/or congested network. The systems, apparatus, and methods may optimize retransmission for lost packets or lost data frames. Optimizations are also provided to select reference frames in a data stream so that block errors are contained when RPS is used to encode data frames. Optimization in decoding may include reconstructing high-resolution data frames from low-resolution data frames.

40 Claims, 7 Drawing Sheets

US 8,472,520 B2

SYSTEMS AND METHODS FOR TRANSMITTING AND RECEIVING DATA STREAMS WITH FEEDBACK INFORMATION OVER A LOSSY NETWORK

RELATED APPLICATIONS

This application is a Continuation of U.S. patent application Ser. No. 12/511,963 filed 29 Jul. 2009 now U.S. Pat No. 7,974,233, which is incorporated herein by reference.

FIELD OF INVENTION

The present invention relates to systems and methods for transmitting and receiving data streams with feedback information over a lossy and congested network.

BACKGROUND

Conventional data packet networks often make use of lossy communication channels, such as wireless communication channels. Although convenient, wireless communication channels do suffer from a number of sources of noise and other impediments which lead to packet loss or corruption during transport. Therefore, it is often the case that data must be retransmitted in order to ensure it is delivered correctly to a receiver. Conventional applications, such as email and web browsing, tolerate relatively long latencies in transmissions and retransmissions, and so communication protocols for delivery of information over computer networks were usually architected on such assumptions.

Modern data streaming applications, such as applications which permit audio and video streaming over the Internet, are less tolerant of retransmission latencies, indeed, of latencies in general. Data streams in applications like video streaming need to be received at an end user device, such as a monitor or an audio player, in near real time so as to provide an acceptable end user viewing experience. This is not true of applications such as email, which can tolerate relatively long latencies without degrading the end user experience to any appreciable degree.

In video-related applications, a video stream is represented by a sequence of images. An encoder analyzes the information in the video stream, discards information that is indiscernible to the viewer and generates data frames for transmission. For example, video encoding techniques, such as those defined by the Motion Pictures Expert Group (MPEG), often break images into macroblocks, each macroblock corresponding to a defined (e.g., 16×16 pixel) area of the original image. The encoder then uses mathematical transforms (e.g., the discrete cosine transform (DCT)) to decompose the macroblocks into frequency components. Each component is weighted by a respective coefficient, and these coefficients are quantized, variable length encoded to remove zeros, and finally, entropy coded using, for example Huffman coding. The result is an encoded version of a frame and in some cases individual frames can be built from reference frames to reduce the overall number of bits required to encode the subject frame. The encoded video frames are typically distinct from data frames that may be used with other applications such as email.

Unfortunately, most wireless networks in use today rely on the transmission control protocol and Interment protocol (TCP/IP) or the user datagram protocol and Internet protocol (UDP/TP) to handle data retransmissions. TCP was, however, originally intended for wired data communication networks where network congestion was the major cause of packet loss and so relatively lengthy latencies are involved where retransmissions are concerned. Accordingly, TCP/IP is not a truly effective mechanism for managing retransmissions across a lossy, but not necessarily congested, network. On the other hand UDP does not perform any retransmissions while delivering data, and as a result produce visible errors that lead to quality of experience (QoE) degradation Traditionally, when one or more packets are lost in a data frame, these lost packets are retransmitted. If a frame or a group of frames is lost, the lost frame or frames are retransmitted. The size of the retransmitted data packets or data frames can be large, resulting in lower success rate in retransmission, which further requires more retransmissions. This introduces significant latency in data transmissions, especially when the transmissions take place over lossy channels. Further, today's retransmission methods set a fixed number of retransmission attempts regardless of the type of packets or frames being transmitted. Such retransmission mechanisms can not easily adapt to changing network conditions and can lead to an overall lower success rate in data transmission. These inefficiencies are magnified when time-sensitive data streams, such as video or audio streams, are transmitted over a lossy channel, as is often the case with wireless links in a network.

SUMMARY OF THE INVENTION

Systems, apparatus, and methods are provided to enhance transmitting and receiving data streams with feedback information over a lossy and/or congested network. The systems, apparatus, and methods may optimize retransmission for lost packets or lost data frames. Optimizations are also provided to select reference video frames in a video stream so that block errors are contained when Reference Picture Selection (RPS) is used to encode data frames. Optimization may also include substituting lower resolution video frames at the encoder and/or an intermediate node, and reconstructing high-resolution video frames from a combination of these low-resolution frames and other unmodified high-resolution frames.

In one embodiment, a system comprising a decoder and an encoder is provided. The decoder may be configured to receive an encoded frame from the encoder via a forward data channel, and to return feedback information regarding the encoded frame to the encoder via a feedback channel. The encoder is configured to receive high resolution (HR) data frames from a source and generate a corresponding low resolution (LR) data frame. The encoder may receive the feedback information from the decoder via the feedback channel. The encoder may also analyze the feedback information and determine whether or not retransmission of a portion of the encoded frame or transmission or retransmission of the corresponding low resolution frame is required. If required, the encoder may either transmit the portion of the encoded frame or the corresponding low resolution frame, as appropriate, to the decoder via the forward data channel. Otherwise, if retransmission of a portion of the encoded frame or transmission or retransmission of the corresponding low resolution frame is not required, the encoder may transmit a subsequent encoded frame to the decoder via the forward data channel.

In another embodiment, a encoder is configured to generate ancillary information that may aid a decoder in properly reconstructing a sequence of frames. The encoder may change the context in which a frame is encoded as part of a sequence, e.g., change between independently coded, progressively coded, and bi-directionally coded, frames and also change the reference picture used in each of these types of encoding.

In another embodiment, a system comprising one or more decoders and an encoder is provided. Each decoder is configured to receive an encoded broadcast data frame via a broadcast channel and an encoded data frame via a data channel, and to return feedback information regarding the encoded broadcast frame to the encoder via a feedback channel. The encoder may be configured to receive high resolution broadcast frames from a source and generate a corresponding encoded low resolution data frame for each high resolution broadcast frame. The encoder may receive the feedback information from each decoder and analyze the feedback information to determine whether or not to retransmit a portion of the encoded broadcast frame or transmit or retransmit the corresponding low resolution frame to the corresponding decoder is required. If required, the encoder transmits either the portion of the encoded broadcast frame or the corresponding low resolution frame, as appropriate, via the corresponding forward data channel to the corresponding decoder.

BRIEF DESCRIPTION OF THE DRAWINGS

The present invention is illustrated by way of example, and not limitation, in the figures of the accompanying drawings in which.

DETAILED DESCRIPTION

Described herein are systems and methods that enhance transmitting and receiving of video data streams over a lossy or congested packet network.

As will be apparent from the description below, various embodiments of the present invention may be implemented in an encoder to analyze feedback information and process video frames accordingly. As an example, a video enhancer (VE) can be connected to or embedded in an Access Point (AP) or a Base Station (BS) in a wireless data packet network. The VE monitors the state of the wireless link, generates a low-resolution (LR) version of a data frame corresponding to a high-resolution (HR) data frame, and when error occurs, may transmit or retransmit the LR data frame instead of the corresponding HR data frame. This technique ensures a higher success rate for the retransmission. In other embodiments, an encoder may generate ancillary information, if necessary, that may aid an decoder in properly reconstructing a sequence of frames. Also the encoder may change the context in which a frame is encoded as part of a sequence, e.g., change between independently coded, progressively coded, and bi-directionally coded, frames and also change the reference picture used in each of these types of encoding. A decoder receiving an LR data frame can reference an immediate preceding or an immediate subsequent HR data frame to reconstruct an intermediate low-resolution frame or a restructured high-resolution frame. Various conditions can be evaluated and acted upon, as detailed in the description below, to achieve a higher success rate of transmission and/or reconstruction of the video at the decoder.

Figure 1:
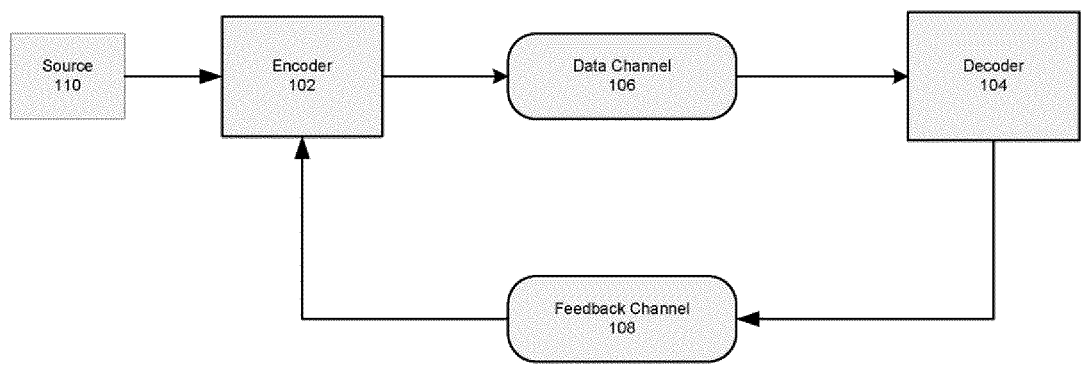
FIG. 1 illustrates a data packet network with feedback for video delivery.

FIG. 1 illustrates a system 100 in which an encode 102 and a decoder 104 communicate with one another through a packet network that includes a forward data channel 106 and a feedback data channel 108. Encoder 102 receives data streams from a source 110, encodes the data streams, and sends the encoded data streams to decoder 104 via forward data channel 106. Source 110 may be any appropriate source of video and/or audio information, for example an audio/video server. Decoder 104 receives the encoded data streams on data channel 106, processes the data streams and decodes the data streams to extract the audio/video information, which may then be passed to an appropriate player (not shown) such as a television (TV) set, etc.

The data streams provided by encoder 102 are composed of frames, each of which is encoded and encapsulated in one or more packets. In addition to decoding and reconstructing the frames from the information included in these packets, decoder 104 also sends feedback information related to each encoded data frame to encoder 102 via feedback channel 108. The feedback information indicates whether the data packets associated with each encoded data frame were received correctly at decoder 104. For example, the feedback information may include acknowledgements (which may be in the form of ACK or NACK packets) appropriate for the communication protocol used by encoder 102 and decoder 104. An ACK packet is generally regarded as a positive acknowledgement of a successful reception, which a NACK packet is generally regarded as an indication that reception was not successful. Depending on the communication protocol being used, one or the other (or indeed both) of these conventions may be used.

The feedback information may be provided at any convenient protocol layer. For example, the feedback information may be provided at the media access control (MAC) layer or at the network layer (which is often an Internet protocol or IP layer) or any other appropriate protocol layer(s). In one embodiment of the invention, feedback information is provided for every packet received by decoder 104, though in other instantiations feedback information may be provided only for groups of packets.

In any event, encoder 102 receives the feedback information on feedback channel 108, analyzes the feedback information, and generates a feedback result based thereon. The result of the analysis may be that encoder 102 transmits one or more successive packets associated with a current or next frame to decoder 104 (e.g., if the analysis indicates that the preceding packet(s) was/were successfully received), or, if the analysis indicates that there was an error in receiving the previous packet(s), the encoder may undertake a retransmission of lost, missing or corrupted information, or may, instead, transmit a lower resolution version of the current data frame to the decoder 104. Further details regarding these decisions and the kinds of information provided to decoder 104 are discussed below.

Figure 2:
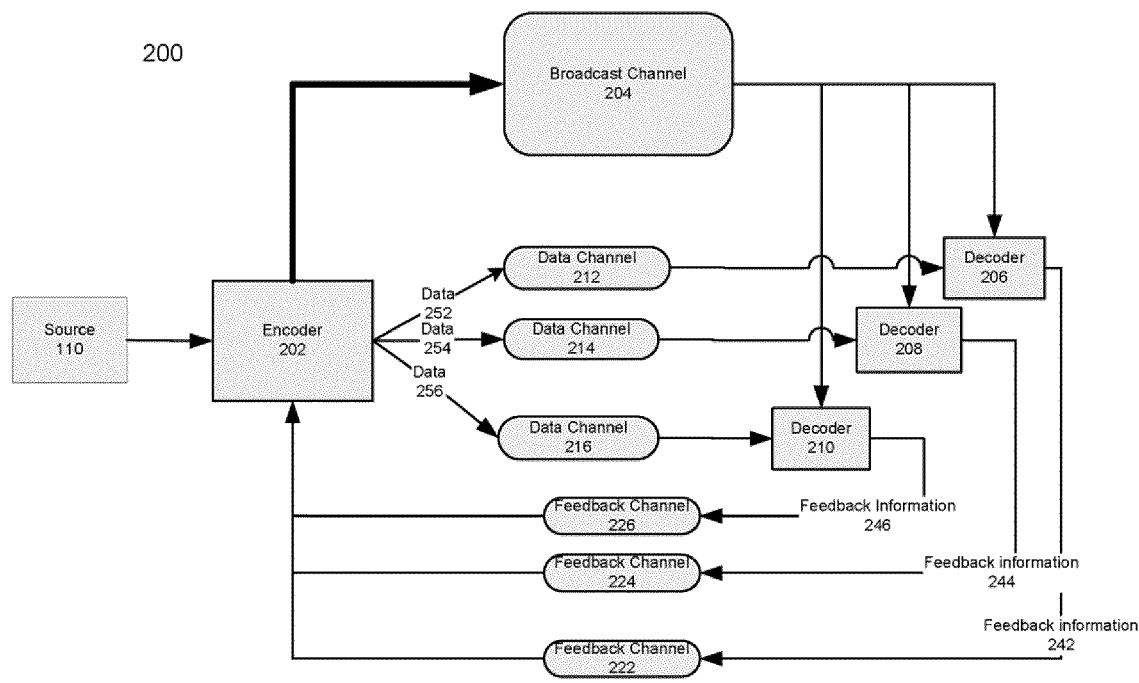
FIG. 2 illustrates a broadcast data packet network with one or more decoders receiving broadcast data streams.

Before describing these details, however, it should be recognized that the system shown in FIG. 1 has many possible variants. For example, FIG. 2 illustrates a system 200 in which multiple decoders each receive a common data stream broadcast by an encoder 202 and each send individual feedback information to the encoder to prompt individualized responses therefrom. Such a system may find particular application in mobile TV deployments and related schemes.

As shown in the illustration, decoder 206 receives the broadcast on a broadcast channel 204 and sends feedback information 242 via a feedback channel 222 to encoder 202. Feedback information 242 indicates whether data packets in the broadcast were received correctly at decoder 206 and may be in the form of ACK and/or NACK packets as discussed above. Likewise, decoders 208 and 210 each receive the broadcast over broadcast channel 204 and each sends its own feedback information, 244 and 246, respectively, to encoder 202 over a respective feedback channel 224, 226. Of course, in other embodiments, the decoders may share one or more common feedback channels, with the feedback information being "personalized" to a decoder through the use of decoder identification information included in the feedback information.

Encoder 202 receives the feedback information 242, 244, 246, analyzes the feedback information, and generates individual feedback results for decoder. Based on the feedback results, encoder 202 sends information 252, 254, 256, needed by the individual decoders to replace any lost information from the broadcast. This may include portions of lost packets or replacement lower resolution versions of the subject frames, as appropriate. This information 252, 254, 256, may be provided over individualized data channels 212, 214, 216 for decoders 206, 208, 210, respectively, or all of the information may be provided over one or more common data channels, with the information being "personalized" to each respective decoder through the use of appropriate identification information.

Figure 3:
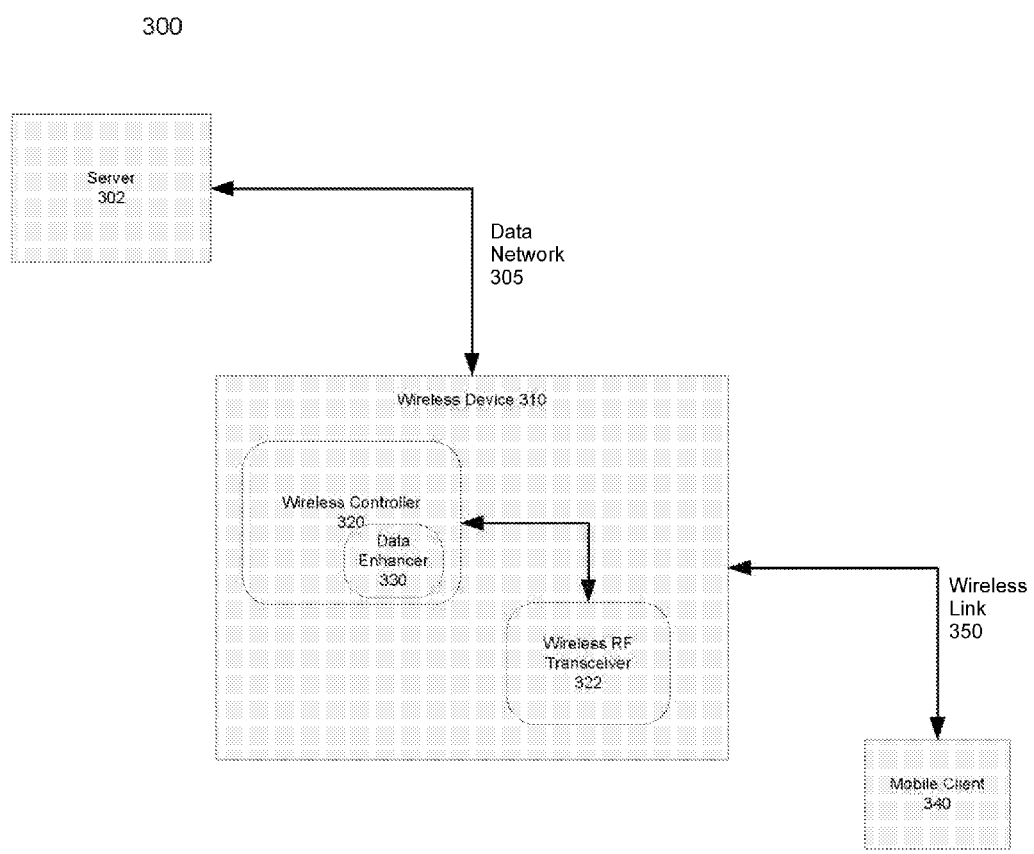
FIG. 3 illustrates an exemplary block diagram of a data packet network where the last link is a wireless line and an video enhancer module is integrated in an encoder.

Examples of systems 100 and 200 include those in which audio/video, fax-over-internet, and/or video-conferencing streams are provided over the Internet, a corporate intranet, or any other kind of data network, especially those where the communication link between the encoder and the decoder (typically the last link in the overall network) is a wireless communication link (such as one that includes an IEEE 802.11 a/b/g/n (WiFi) channel or a wireless wide area network (WWAN) data channel operating on any cellular data network protocol). FIG. 3 shows an example of a packet network 300 in which the last link consists of a wireless link.

In this example, server 302 sends a first data stream to a wireless device 310 over the Internet, or a corporate intranet, or any other kind of data network 305. Wireless device 310 processes the first data stream and sends a second data stream to a mobile client 340 over a wireless link 350. Mobile client may be a mobile phone, portable computer, portable game console, personal digital assistant, or other device.

Wireless device 310 includes a wireless controller 320 and a wireless radio frequency (RF) transceiver 322. Wireless controller 320 may be embedded within wireless RF transceiver 322, or connected to wireless transceiver 322 via, for example, an Ethernet connection. Wireless RF transceiver 322 may be an Access Point (AP) in a WiFi network or a Base Station (BS) in a data cellular system. Wireless Controller 320 may be a wireless link controller (WLC) in a WiFi network or a Base Station Controller (BSC) in a data cellular system.

A video enhancer (VE) (also referred to as data enhancer) 330 is integrated in wireless device 310. VE 330 may be either embedded in wireless controller 320 or connected to an AP or a BS. VE 330 monitors the state of wireless link 350, the status of delivery of each data packet transmitted over the wireless link 350 from wireless device 310 to mobile client 340, and other relevant information related to wireless link 350. VE 330 processes and modifies a video stream provided to mobile client 340 according to feedback information received from mobile client 340 before sending packets associated with the video stream through wireless link 350.

Video enhancer 330 can be integrated in (or can itself be) an encoder, such as encoder 102 or 202, to process and modify data streams over a packet network. As will become evident from the discussion below, VE 330 receives high-resolution (HR) data frames from a source (e.g., server 302) and encodes them for transmission to mobile client 340 over wireless link 350. For each HR frame, VE 330 generates and stores (at least temporarily) a corresponding low-resolution (LR) data frame. Then, responsive to feedback information from mobile client 340, if the feedback information indicates that information associated with an HR frame sent to mobile client 340 has been lost, VE 330 makes a determination as to whether to send (i.e., retransmit) the lost information associated with the HR frame or, instead, to provide the corresponding LR version of the subject frame to mobile client 340. In a case where an LR frame, or information associated therewith, has been lost, VE 330 may retransmit the lost information and/or take other action. For example, VE 330 may adjust the encoding bit rate for HR and/or. LR frames according to link conditions as determined by a Packet Error Rate (PER) or an available network bandwidth. In addition, VE 330 may insert frames (e.g., frames containing superimposed advertisements) between frames of a video stream received from the source. Further, VE 330 may reshape frames based on network and/or other conditions. These and other details of the encoding and decoding processes are discussed below.

Figure 4:
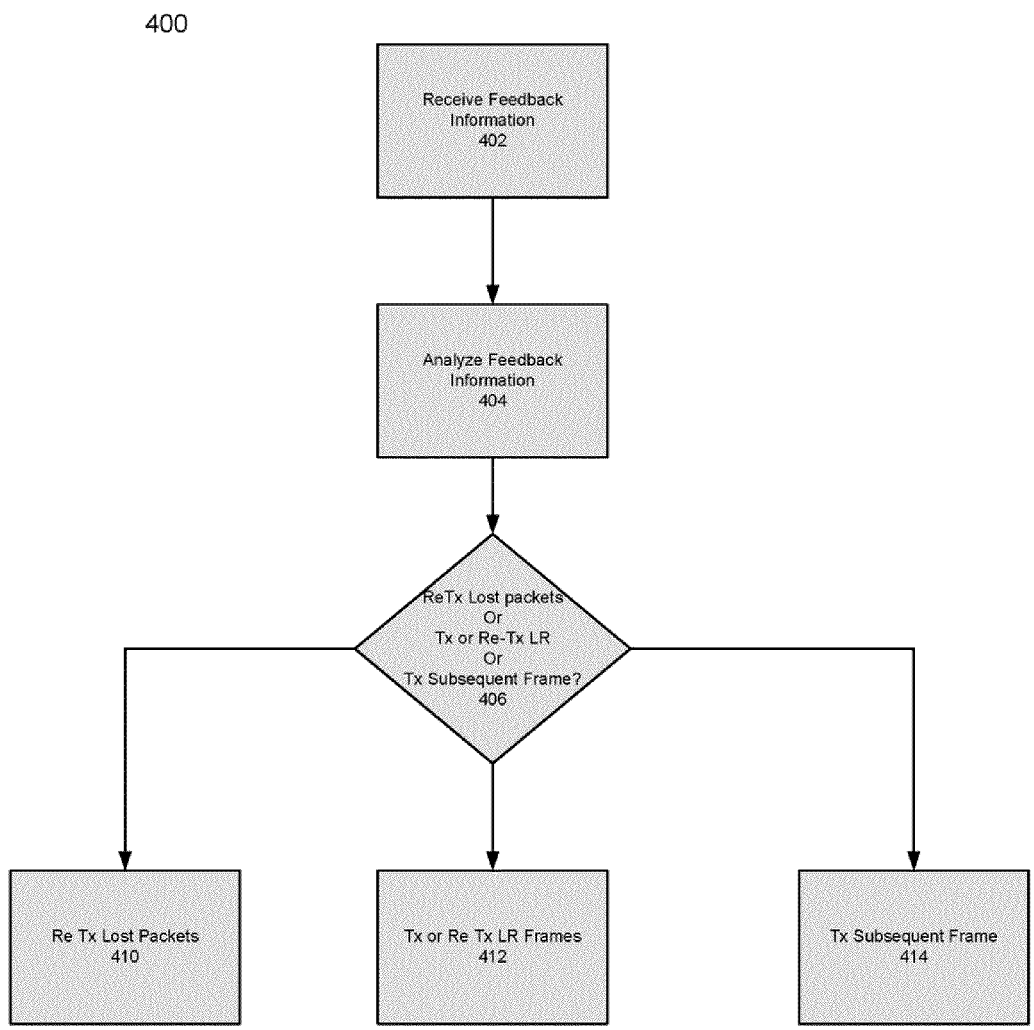
FIG. 4 illustrates a flow chart showing an exemplary process for analyzing feedback information and either retransmitting lost packets in a data frame, or transmitting or retransmitting a low-resolution version of the entire data frame, or transmitting a subsequent encoded data frame.

FIG. 4 illustrates one example of an encoding process 400, which may be performed by VE 330 in accordance with embodiments of the present invention. At 402, VE 330 receives feedback information from a decoder, like decoder 104, associated with the mobile client 340. The feedback information is analyzed at 404, and based on the analysis a determination is made at 406 as to whether the decoder has reported any loss of information. If there was no loss of information (e.g., if the packets associated with the current frame were successfully received and decoded), VE 330 begins transmitting packets associated with the next HR frame at 414.

If, however, the analysis indicates information associated with the current frame was lost or was not properly decoded, the action taken by VE 330 will depend on the outcome of some further determinations. In one embodiment, if the entire current frame was lost or corrupted, the corresponding LR version of the frame is transmitted to the decoder at 412. As will be discussed below, the LR version of the frame is prepared concurrently with the transmission of the HR version thereof for use in such situations.

If, however, only part of the current frame was lost or corrupted, then VE 330 determines whether retransmitting the lost/corrupted information or sending the LR version of the frame would be the better course of action. This may be done, for example, by comparing the size or number of data packets which would be required in each instance. If the size/number of the packets required to retransmit the lost information is smaller/fewer than the size/number of packets required to transmit the LR version of the frame, then VE 330 will retransmit the lost information from the HR frame at 410. On the other hand, if the size/number of packets required to transmit the LR version of the frame is smaller/fewer than the size/number of packets required to retransmit the lost information from the HR version of the frame, then VE 330 will transmit the LR version of the frame at 412. If the analysis at 404 indicates a loss of information associated with an LR frame, then the determination made at 406 concerns whether or not to retransmit the LR frame at 412. The method ensures that only minimal bandwidth and latency penalties are paid for the retransmission of lost information versus those which would be incurred if an entire HR frame were retransmitted.

In one embodiment of the invention, a different channel (e.g., a different transmit frequency or code) may be used to transmit or retransmit the lost information and/or the LR versions of the frames than was used to transmit the corresponding HR fames. Alternatively, or in addition, the LR frames may be provided more retransmission attempts than their corresponding HR frame counterparts. This increases the probability of successfully transferring an LR frame to the decoder.

Figure 5:
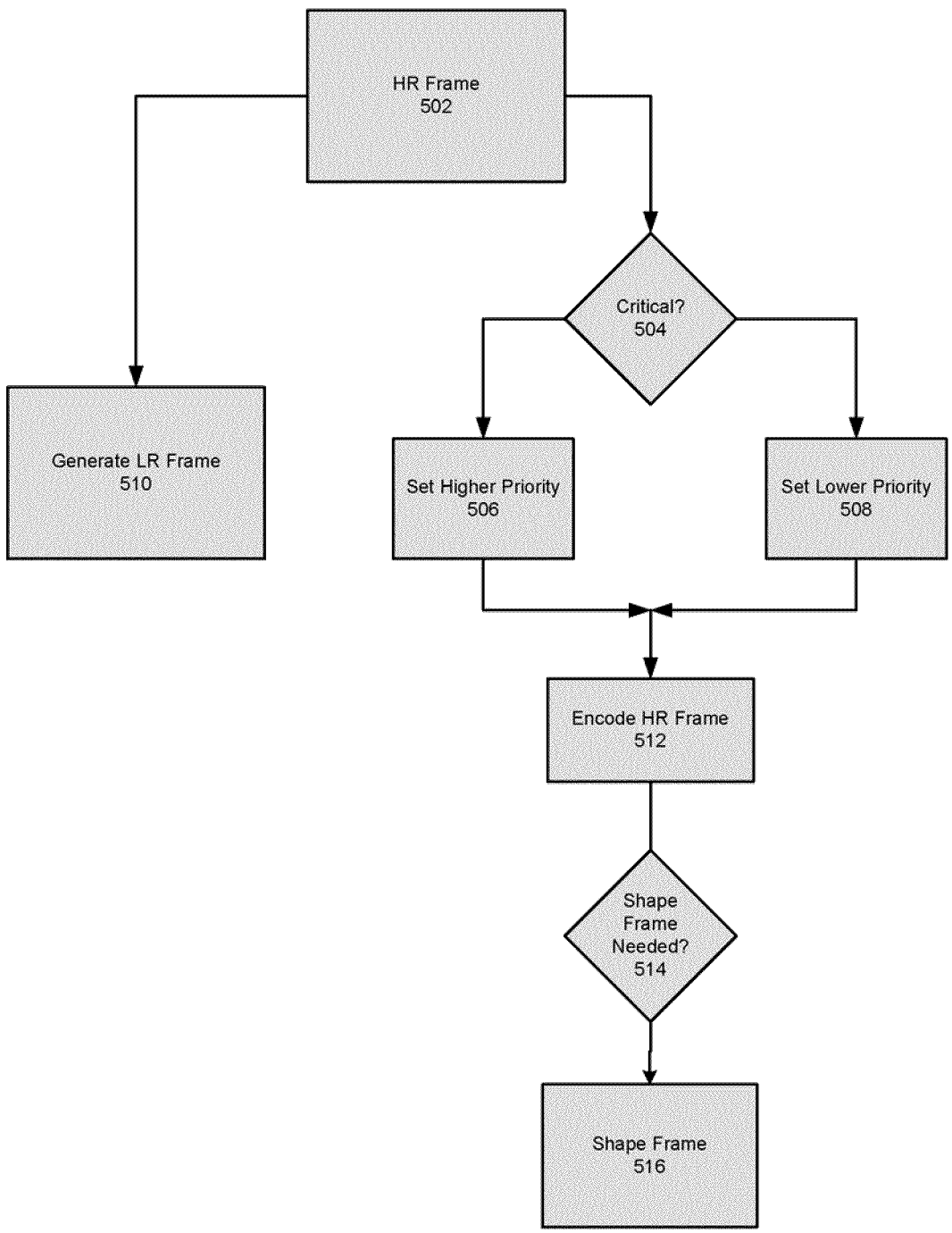
FIG. 5 illustrates a flow chart showing an exemplary process for processing high resolution data frames in an encoder.

FIG. 5 illustrates an example of a process 500 for handing HR frames received at VE 330. An HR frame is received at 502 and forwarded to an LR frame generator to produce a corresponding LR frame at 510. In one embodiment of the invention, producing an LR version of a frame involves decoding and filtering (e.g., low pass filtering) the FIR frame and then sub-sampling the result to produce a frame having fewer pixels than the original. This frame with the reduced number of pixels is then re-encoded to produce the LR counterpart frame. Where the HR frames are encoded using H.264-compliant encoding, then decoding an HR frame yields Discrete Cosine Transform (DCT) co-efficients, which may be re-quantized at a lower bit rate to yield an LR version of the frame.

In parallel with the production of an LR version of the current frame, at 504 VE 330 determines whether the subject frame is a critical frame. This determination may depend on the encoding scheme used for the video stream as a whole. For example, in video stream encoded according to schemes promulgated by the Motion Picture Experts Group (MPEG) not all frames are equal. Some frames, so-called I-Frames (independent frames), are more important because they serve as the basis by which other frames, so called B-frames (backward prediction frames) and P-frames (progressive frames), are themselves encoded. Loss of an I-frame, therefore, affects no only the I-frame itself, but also all of the B-frames and P-frames that are encoded with reference to that I-frame. More particularly, loss of an I-frame corrupts an entire group-of-pictures (GOP), loss of a P-frame corrupts only those frames from the subject P-frame up to the GOP boundary, and loss of a B-frame leads to that particular frame being corrupted. Accordingly, VE 330 treats critical frames differently than other frames so as to minimize the overall impact on the viewing experience caused by losses of information during transfer between the encoder and the decoder.

If the subject frame is determined to be a critical frame, it is treated with higher priority and packets that deliver such a frame will be associated with a higher maximum retransmission count at 506 than is the case if the subject frame is determined not to be a critical frame (in which case the subject frame is treated with lower priority and is accorded a lower maximum retransmission count at 508). For example, in the case of MPEG streams, I-frames, P-frames and B-frames may be separated from each other and different rules may be applied. Packets associated with I-frames may be deemed high priority packets and may receive a corresponding higher maximum retransmission count at 506, while packets associated with P-frames and B-frames may be set to lower priority and accorded a lower maximum retransmission count at 508. Following the prioritization, the HR frame is encoded at 512 and a determination is made at 514 as to whether or not to reshape the frame. If reshaping is needed, the frame is reshaped at 516 before being transmitted. Otherwise, the encoded HR frame is transmitted. Additionally, within a frame, certain packets may be deemed to be carrying information that is more critical to the visual experience than others. For example, luma information may be treated as more important than chorma information. Also, lower frequency DCT coefficients derived as part of the encoding may be treated as more important than higher frequency DCT components.

In one embodiment of the invention, VE 330 uses Reference Picture Selection (RPS) to encode an HR frame at 512 and keeps a list of reference frames. In this scheme, a last-positively-acknowledged (ACK) frame is selected as a reference frame. If the frame immediately preceding the current HR frame is not positively acknowledged, then the current frame is encoded with respect to the reference frame. Accordingly, if block errors appear in any one frame because of packet losses, they will not propagate to the next frame. This is in contrast to encoding schemes where the appearance of a block error will continue up to a GOP boundary.

With this form of positive acknowledgment RPS, block error propagation is guaranteed to be eliminated. However, if there is significant latency in terms of the number of frames between the encoding of a current frame and the arrival of a positive acknowledgment concerning the previously transmitted frame, the effective bit rate penalty is expected to be quite high. Accordingly, in another embodiment of the invention, the list of reference frames is updated upon receipt of a negative acknowledgement (NACK) concerning a frame or a group of frames. That is, the NACK-ed frame or frames are removed from the list of reference frames. At 512 then, the current HR frame is encoded using a non-NACK-ed reference frame. This procedure does not guarantee that block errors will be eliminated within one frame, but here even if there is significant latency in terms of the number of frames between the encoding of the current frame and the arrival of the NACKs, the effective bitrate penalty is expected to be lower than in the ACK-reference method.

With respect to the determination at 514 as to whether to execute I-frame shaping, consider a situation where multiple simultaneous streams of video are being provided to multiple clients from the same AP or BS. In such a situation, it is possible, even likely, that there will be simultaneous instances of I-frames in two or more of the streams, leading to higher instantaneous bandwidth requirements. Typically, I-frames have roughly 15 times more data than corresponding P-frames for the same video information. In systems where an encoder, like encoder 102, communicates with multiple clients, there may be several I-frames that may coincide in time from all the streams, leading to a temporary bottleneck. In those cases, the frame shaping at 516 takes some of the I-frames associated with various ones of the streams and re-encodes them as P-frames so that the number of concurrent I-frames that require transmission is reduced. This helps smooth delivery of bursty video traffic and reduces the number of stalls.

Figure 6:
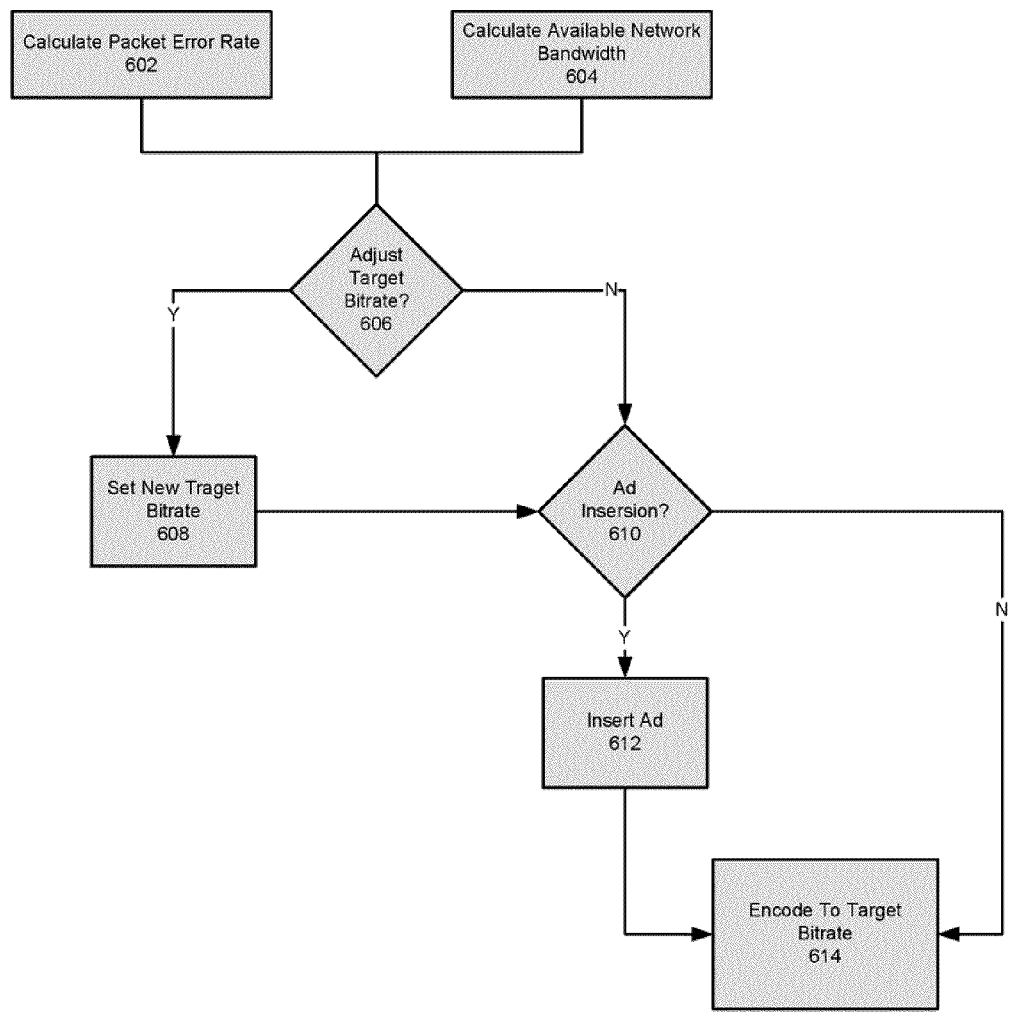
FIG. 6 illustrates a flow chart showing an exemplary process for adjusting a target bitrate.

FIG. 6 illustrates further details 600 of the encoding process used by VE 330. In one realization, the target bit rate used for transmission of the frames may be increased or decreased on the fly, in order to, for example, adapt to the available network bandwidth, and/or the instantaneous error rate. At 602 a packet error rate is calculated and at 604 an available network bandwidth is calculated. These figures are analyzed and at 606 a determination is made as to whether or not to adjust the target bit rate of the encoder. If so, the new target bit rate is set at 608.

The encoder may also be used for ad insertion. Accordingly, at 610, a determination may be made as to whether or not to insert an advertisement. If advertisement insertion is desired, then at 612 the advertisement is inserted in between frames that are sent to the decoder before the final encoding at the target bit rate at 614. Otherwise, no ads are inserted before this final encoding process. In one embodiment, individual viewers may be identified on the basis of decoder MAC addresses, an EIN number associated with a WWAN device, or any other means that identifies a viewer or viewers. Customized advertisements, based on the viewer identification (e.g., with reference to a viewer profile) may be inserted into the video stream on a frame-by-frame basis, before a video frame is transcoded to fit the target bit rate at 614. Selection of one of several pre-delivered advertisement sequences may be made (e.g., at 612) based on, for example the MAC address of the decoder, and overlaid onto the encoded video frames before the final transcoded video frame is produced.

In a particular realization, the bit rate adaptation process is performed with respect to the packet error rate (PER). The PER is compared to predetermined thresholds. If the PER is greater than a predetermined high-PER threshold, the target bit rate is decreased. Otherwise, if the PER is lower than a predetermined low-PER threshold, the target bit rate is increased. If the PER is within the high and low thresholds, modification may, but need not, be made.

In another realization, bit rate adaptation may be done with respect to the available network bandwidth, which is computed at 604 by monitoring the size of the encoder's transmission queue and the arrival of packets at a sliding window with respect to its historical size. If the transmit queue increases in size at a rate faster than the rate of packet arrivals, it indicates a decrease in available network bandwidth, which consequently means a necessary decrease in the target bit rate, and vice versa.

The rate control to the desired bit rate at 614 is achieved using either the quantization parameters used to quantize DCT coefficients of luma and chroma components (or both) and/or the frame rate of the encoded data. In one embodiment, if the available target bit rate is greater than or equal to a predetermined fraction of the incoming bit rate, frame quantization may be used to produce an equivalent frame that is quantized further to the desired bit rate (e.g., using quantization techniques known in the art). If, however, the available target bit rate is less than the predetermined fraction of the incoming bit rate then the frame rate is lowered by, for example, dropping some frames out of the incoming sequence to fit into the desired bit rate.

Figure 7:
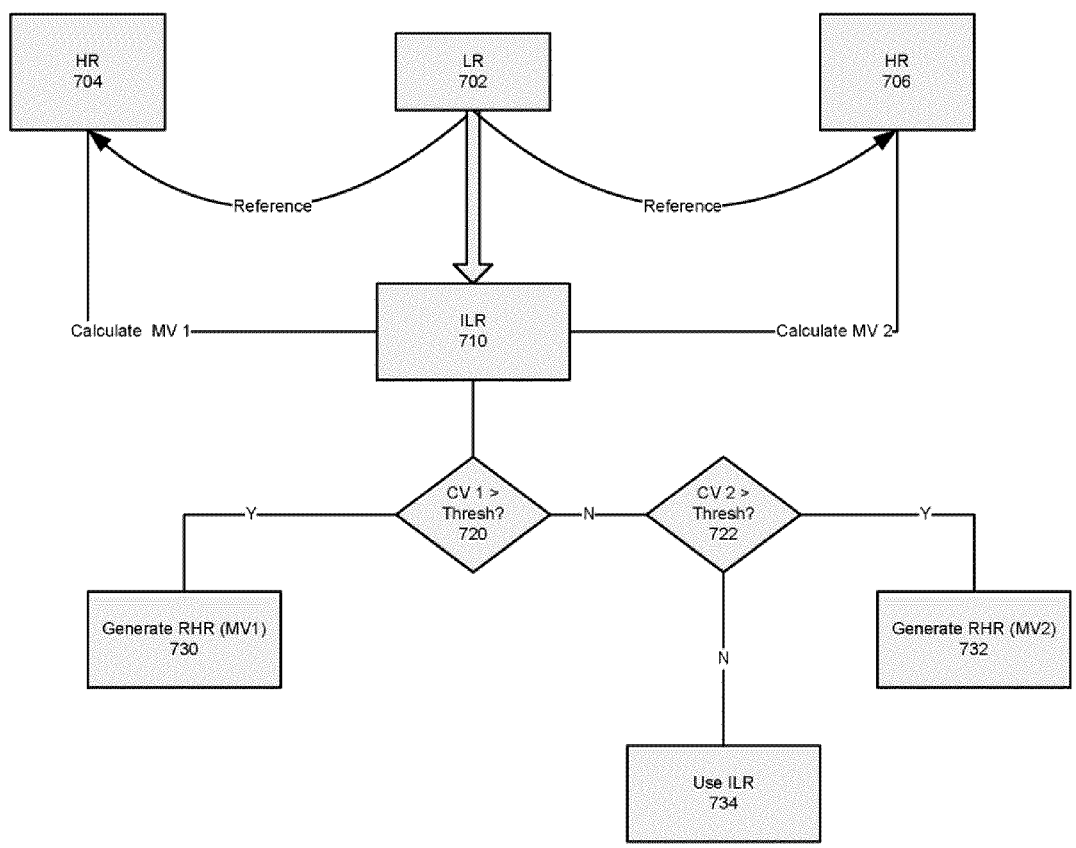
FIG. 7 is an exemplary block diagram showing a HR restoration process in a decoder.

Referring now to FIG. 7, the operation of an HR restoration unit 700 which is consistent with an embodiment of the present invention is illustrated. An HR restoration unit 700 can be integrated in a decoder, like decoder 104 or decoders 206, 208, 210, to produce a pseudo-high resolution frame from an LR frame that was substituted in place of an HR frame by an encoder. The pseudo-high resolution frame is produced using high-resolution frame information resident in the HR frames preceding and/or following the subject LR frame.

For purposes of the following explanation, assume that HR restoration unit 700 is part of a decoder that receives frames from an encoder in the fashion discussed above. Then, as shown in FIG. 7, assume that the HR restoration unit has received LR frame 702 and either or both of HR frame 704 and HR frame 706. HR frame 704 is the HR frame immediately preceding LR frame 702. HR frame 706 is the HR frame immediately following LR frame 702.

To produce the pseudo-high resolution frame, HR restoration unit 700 up-samples LR frame 702 to produce an intermediate HR frame (IHR) 710. This may be done using up-sampling techniques known in the art, such as chroma up-sampling. HR restoration unit 700 subsequently performs a motion search between HR frame 704 and IHR 710 to identify a first motion vector (MV 1) and computes a first confidence value (CV 1) (again, this may be done using techniques known in art). At 720, the first confidence value CV 1 is compared to a predetermined threshold value. If CV 1 is greater than the predetermined threshold, HR restoration unit 700 uses HR 704 translated by MV 1 to produce the pseudo-high resolution frame, which in this instance is a restructured HR frame (RHR) 730.

If, on the other hand, CV 1 is less than the predetermined threshold, a second motion vector (MV 2) is generated by performing a motion search between HR frame 706 and IHR 710, and a second confidence value (CV 2) calculated therefrom. Subsequently, at 722, CV 2 is compared to the predetermined threshold value, and if CV 2 is higher than the predetermined threshold, HR restoration unit 700 uses HR 706 translated by MV 2 to produce a restructured HR frame (RHR) 732. If neither CV 1 nor CV 2 satisfies the predetermined threshold, IHR frame 710 is used at 734 (e.g., it is provided for playback on the client). Note, if only one or the other of HR frames 704 and 706 is available, the above-described process may be truncated to only provide a single-sided evaluation of a confidence value.

As should be apparent from the discussion thus far, various embodiments of the present invention may be implemented with the aid of computer-implemented processes or methods (a.k.a. computer programs or routines) or on any programmable or dedicated hardware implementing digital logic. Such processes may be rendered in any computer language including, without limitation, C#, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ and the like, or on any programmable logic hardware such as a CPLD, FPGA or the like, or on any dedicated hardware or VLSI circuits. In general, however, all of the aforementioned terms as used herein are meant to encompass any series of logical steps performed in a sequence to accomplish a given purpose.

It should also be appreciated that the portions of this detailed description that are presented in terms of computer-implemented processes and symbolic representations of operations on data within a computer memory are in fact the preferred means used by those skilled in the computer science arts to most effectively convey the substance of their work to others skilled in the art. In all instances, the processes performed by the computer system are those requiring physical manipulations of physical quantities, such as the capturing of images of physical world objects, the transformation of those images into frames, the encoding and transmission of the frames, and the reconstruction of the encoded frames into images for presentation to a viewer.

The computer-implemented processes are usually, though not necessarily, embodied the form of electrical or magnetic information (e.g., bits) that is stored (e.g., on computer-readable storage media), transferred (e.g., via wired or wireless communication links), combined, compared and otherwise manipulated. It has proven convenient at times, principally for reasons of common usage, to refer to these signals as bits, values, elements, symbols, packets, frames, characters, terms, numbers or the like. It should be borne in mind, however, that all of these and similar terms are to be associated with the appropriate physical quantities and are merely convenient labels applied to these quantities. Unless specifically stated otherwise, it should be appreciated that the use of terms such as processing, computing, calculating, determining, displaying or the like, refer to the action and processes of a computer system, or similar electronic computing device, that manipulates and transforms data represented as physical (electronic) quantities within the computer system's registers, memories and other storage media into other data similarly represented as physical quantities within the computer system memories, registers or other storage media.

Embodiments of the present invention can be implemented with apparatus to perform the operations described herein. Such apparatus may be specially constructed for the required purposes, or may be appropriately programmed, or selectively activated or reconfigured by a computer-readable instructions stored in or on computer-readable storage media (such as, but not limited to, any type of disk including floppy disks, optical disks, hard disks, CD-ROMs, and magnetic-optical disks, or read-only memories (ROMs), random access memories (RAMs), erasable ROMs (EPROMs), electrically erasable ROMs (EEPROMs), magnetic or optical cards, or any type of media suitable for storing computer-readable instructions) to perform the operations. Of course, the processes presented herein are not restricted to implementation through computer-readable instructions and can be implemented in appropriate circuitry, such as that instantiated in an application specific integrated circuit (ASIC), a programmed field programmable gate array (FPGA), or the like.

Aspects of the present invention may also embodied in the form of systems, methods, and apparatus for transferring video information from a computing device (e.g., a portable computer) to a projector, television or some other display device over a wireless communication channel. A Wireless Projector Adapter (WPA) connects to the computing device to the projector over a wireless network, such as an IEEE 802.11 a/b/g/n (WiFi) network. This allows for delivery of high resolution video information from the computing device in real-time, despite possible packet losses and/or network congestion. To facilitate this delivery, an instance of the present encoder is installed on the computing device and the WPA runs an instance of the decoder. The encoder and decoder operate in the fashion discussed above.

One potential problem with having to install software on the computing device is having to instruct users as to how to accomplish same. The present invention minimizes the difficulty involved in such activities as follows. The projector equipped with the WPA (which may be an attachment to a conventional projector or embodied in a wireless projector) is configured to display an instruction screen upon power up. The instruction screen includes an address, for example a URL (Uniform Resource Locator), at which an instance of the software to be installed on the computing device can be obtained. Thus, the user is prompted to launch a browser and navigate to the specified URL through the simple activity of powering up the projector.

Figure 8:
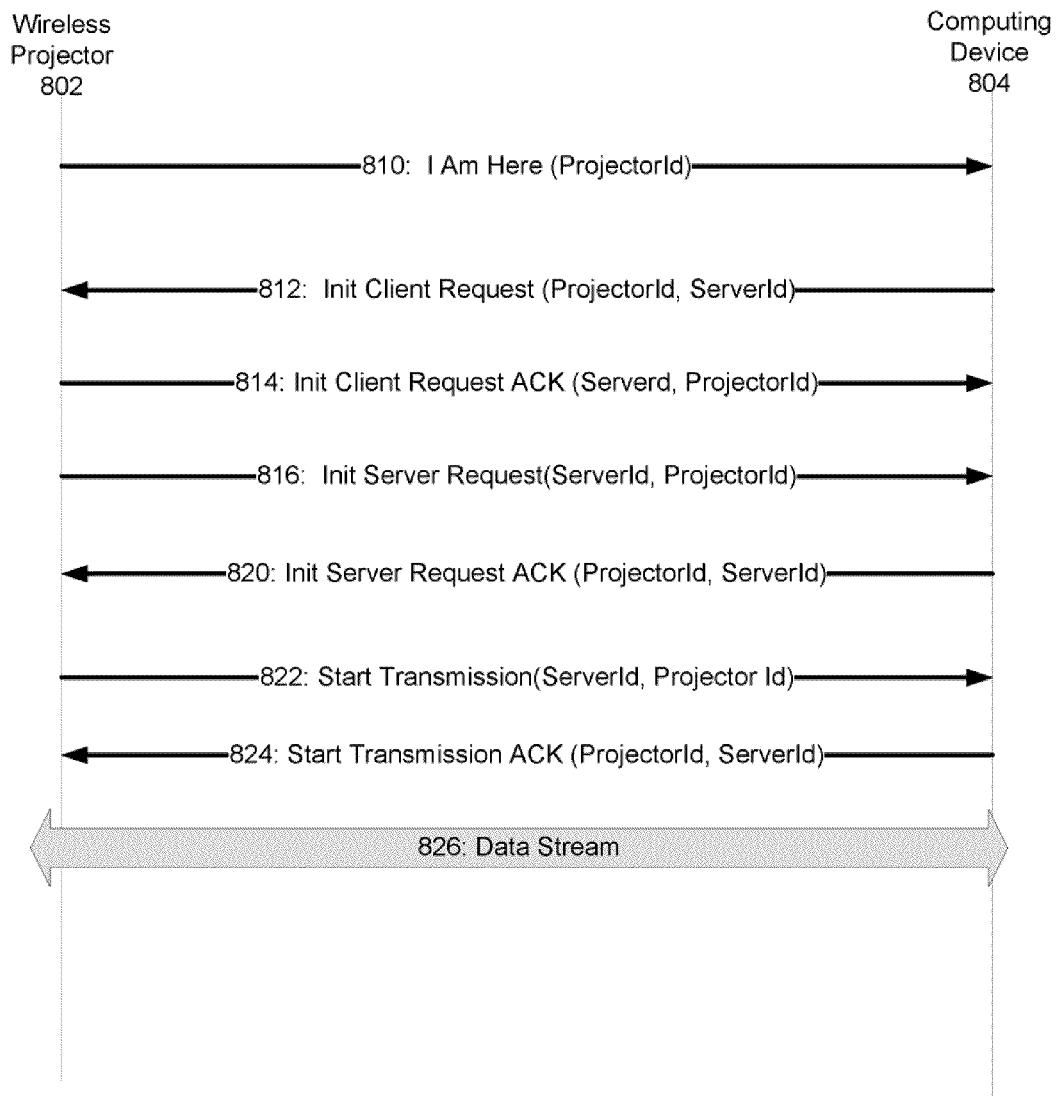
FIG. 8 is an exemplary message sequence diagram showing a handshaking sequence between a wireless projector and a computing device.

Preferably, the URL specified in the instruction screen is an address associated with the WPA. That is, the address is not a conventional Web site, but instead is associated with a server resident on the WPA. Hence, when a user navigates a browser to the specified URL, the browser will actually be directed to that server, making the system consisting of the computer and the WPA self-sufficient for the purpose of installing and using the software without regard to internet access. Referring now to FIG. 8, an example of an exchange between the server associated with the projector 802 and the browser running on the computing device 804 is illustrated.

The projector 802 broadcasts a message 810 that include a projector ID. Computing device 804 detects message 810 and initiates a connection with the wireless projector 802 by sending message 812, "Init Client Request", with its own server ID as the source and the projector ID as the destination. Wireless projector 802 receives message 812 and replies with message 814, "Init Client Request ACK", which includes the projector ID as the source and the computing device's server ID as the destination. The use of these source sand destination addresses assures each device that it is communicating with the proper other device and not, for example, a rogue device.

Wireless projector 802 then sends message 816, "Init Server Request", which includes the projector ID as the source and the computing device's server ID as the destination. Computing device 804 receives messages 814 and 816, and replies with message 820, "Init Server Request ACK", which includes the computing device's own server ID as the source and the projector ID as the destination. Wireless projector 802 receives message 820 and replies with message 822, "Start Transmission", which has the projector ID as the source and the computing device's server ID as the destination. Computing device 804 receives message 822 and replies with message 824, "Start Transmission ACK", which includes its own server ID as the source and the projector ID as the destination. In response, the projector (i.e., the WPA) downloads the software to the computing device at 826. In one realization, the messages 814 and 816 can be combined, while messages 820, 822 and 824 can be skipped.

Once the appropriate software has been downloaded, the computing device can encode video information for presentation via the wireless projector in the manner discussed above. Encoded video information can be passed using a protocol similar to that described above using appropriate IDs for the computing device and the projector.

Thus, systems and methods that enhance transmitting and receiving of data streams over a lossy or congested packet network have been described. The foregoing examples of these systems and methods should not, however, be read as limiting the present invention. Instead, the scope of the invention is best appreciated with reference to the claims, which now follow.

What is claimed is:

1. A system, comprising:
   a decoder configured to receive an encoded frame from an encoder via a forward data channel, and to return feedback information regarding the reception of some or all of the encoded frame to the encoder via a feedback channel, wherein the encoder is configured to:
   receive data frames at a first resolution from a source,
   for each data frame at the first resolution, generate a corresponding encoded data frame at a second resolution,
   responsive to the feedback information received from the decoder, analyze the feedback information to determine which of
   (i) retransmission of a portion of the encoded frame at the first resolution, or
   (ii) transmission of the corresponding data frame at the second resolution is required, and,
   transmit either the portion of the encoded frame at the first resolution or the corresponding encoded data frame at the second resolution, as appropriate, to the decoder via the forward data channel, otherwise, if retransmission of a portion of the encoded frame at the first resolution or transmission of the encoded data frame at the second resolution is not required, transmit a subsequent encoded frame at the first resolution to the decoder via the forward data channel.

2. The system in claim 1, wherein the data frames comprise video data.

3. The system in claim 2, wherein the encoder is further configured to generate ancillary information to aid the decoder in properly reconstructing a sequence of the data frames.

4. The system in claim 2, wherein the encoder is further configured to change a context in which one or more of the data frames are encoded as part of a sequence.

5. The system in claim 4, wherein the encoder is configured change context between independently coded ones of the data frames.

6. The system in claim 4, wherein the encoder is configured change context between progressively coded ones of the data frames.

7. The system in claim 4, wherein the encoder is configured change context between bi-directionally coded ones of the data frames.

8. The system in claim 4, wherein the encoder is further configured to change reference pictures used in different encoding contexts.

9. The system in claim 2, wherein the feedback information includes acknowledgements appropriate for a communication protocol used by the encoder and the decoder.

10. The system in claim 9, wherein the acknowledgements include positive acknowledgements of a successful reception by the decoder.

11. The system in claim 9, wherein the acknowledgements include indications that reception by the decoder was not successful.

12. The system in claim 9 wherein the acknowledgements include both positive acknowledgements of a successful reception by the decoder and indications that reception by the decoder was not successful.

13. The system in claim 2, wherein the feedback information is provided at one of a media access control (MAC) layer or at a network layer.

14. The system in claim 2, wherein the feedback information is provided for every packet received by decoder.

15. The system in claim 2, wherein the feedback information is provided for groups of packets received by the decoder.

16. The system in claim 2, wherein if an entire current frame is lost or corrupted, transmission of the corresponding data frame at the second resolution to the decoder is required.

17. The system in claim 2, wherein the encoder is configured to prepare the corresponding encoded data frame at the second resolution concurrently with transmission of the data frame at the first resolution.

18. The system in claim 1, wherein the encoder is configured to retransmit the portion of the encoded frame at the first resolution if a number of packets required to retransmit the portion of the encoded frame at the first resolution is fewer than a number of packets required to transmit the corresponding encoded data frame at the second resolution, and to transmit the corresponding encoded data frame at the second resolution if the number of packets required to transmit the corresponding encoded data frame at the second resolution is fewer than the number of packets required to retransmit the portion of the encoded frame at the first resolution.

19. The system in claim 18, wherein the encoder is further configured to retransmit the corresponding encoded data frame at the second resolution or transmit a portion of the transmit the corresponding encoded data frame at the second resolution according to feedback from the decoder concerning loss of a corresponding encoded data frame at the second resolution.

20. The system in claim 1, wherein the encoder is configured to make multiple attempts to transmit the corresponding encoded data frame at the second resolution where necessary.

21. The system in claim 1, the encoder is configured to produce the corresponding encoded data frame at the second resolution by decoding and filtering the encoded frame at the first resolution, sub-sampling a result to produce a frame having fewer pixels than the encoded frame at the first resolution, and then re-encoding the frame having fewer pixels than the encoded frame at the first resolution to produce the corresponding encoded data frame at the second resolution.

22. The system in claim 1, wherein the encoder is further configured to determine whether a subject data frame is a critical frame, and, if so to afford the critical frame a higher priority and a higher maximum retransmission count than if the subject data frame is determined not to be a critical frame.

23. The system in claim 22, wherein packets associated with I-frames are deemed high priority packets.

24. The system in claim 22, wherein the encoder is further configured to determine whether or not to reshape at least some of the data frames following prioritization and encoding, but prior to transmission.

25. The system in claim 24, wherein reshaping of at least some of the data frames comprises modifying I-frames to become P-frames.

26. The system in claim 1, wherein the encoder is configured to keep a list of reference frames, each last-positively-acknowledged frame from the decoder being selected as a reference frame.

27. The system in claim 26, wherein if a frame immediately preceding a current frame at the first resolution is not positively acknowledged, then the current frame is encoded with respect to a last reference frame.

28. The system in claim 26, wherein the encoder is configured to update the list of reference frames upon receipt of a negative acknowledgement concerning a frame or a group of frames from the decoder.

29. The system in claim 1, wherein the encoder is further configured to compute a packet error rate and an available network bandwidth, and to determine whether or not to adjust a target bit rate of the encoder based on an analysis of the packet error rate and the available network bandwidth.

30. The system in claim 29, wherein the encoder is further configured to insert advertisements between frames that are sent to the decoder before encoding the data frames at the target bit rate.

31. The system in claim 30, wherein the advertisements are customized for individual viewers according to decoder media access controller (MAC) addresses, an EIN number, or another viewer identifier.

32. The system in claim 31, wherein the encoder is configured to insert customized advertisements, based on viewer identification, into a video stream on a frame-by-frame basis.

33. The system in claim 29, wherein the encoder is configured to adjust the target bit rate according to a comparison of the packet error rate (PER) with predetermined thresholds such that if the PER is greater than a predetermined high-PER threshold, the target bit rate is decreased, otherwise, if the PER is lower than a predetermined low-PER threshold, the target bit rate is increased, and if the PER is within the high-PER and low-PER thresholds, the target bit rate may, but need not be, modified.

34. The system in claim 29, wherein the encoder is configured to adjust the target bit rate with respect to the available network bandwidth, which is computed by monitoring a size of the encoder's transmission queue and arrivals of packets at a sliding window with respect to a historical size of the transmission queue, such that if the transmission queue increases in size at a rate faster than a rate of packet arrivals, the encoder treats this as a decrease in available network bandwidth, and decreases the target bit rate, while if if the transmission queue decreases in size at a rate faster than the rate of packet arrivals, the encoder treats this as an increase in available network bandwidth, and increases the target bit rate.

35. The system in claim 29, wherein the encoder is configured to use frame quantization to produce an equivalent frame that is quantized to a desired target bit rate if the target bit rate is greater than or equal to a predetermined fraction of an incoming bit rate, and to drop frames if the available target bit rate is less than the predetermined fraction of the incoming bit rate.

36. The system in claim 1, wherein the decoder is configured to produce a pseudo-first resolution frame from a second resolution frame that was substituted in place of a first resolution frame by the encoder using first-resolution frame information resident in first resolution frames preceding and/or following a subject second resolution frame.

37. The system in claim 36, wherein the decoder is configured to produce the pseudo-first resolution frame by up-sampling the second resolution frame to produce an intermediate frame, performing a motion search between a first first resolution frame and the intermediate frame to identify a first motion vector, computing a first confidence value and comparing the first confidence value to a predetermined threshold value, wherein if the first confidence value is greater than the predetermined threshold, the decoder uses the prior first resolution frame translated by the first motion vector to produce the pseudo-first resolution frame; but if the first confidence value is less than the predetermined threshold, a second motion vector is generated by performing a motion search between a second first resolution frame and the intermediate frame, and a second confidence value is calculated therefrom and compared to the predetermined threshold value, so that if the second confidence value is greater than the predetermined threshold, the decoder uses the second first resolution frame translated by the second motion vector to produce a restructured first resolution frame (RHR); otherwise the decoder uses the intermediate frame as the pseudo-first resolution frame.

38. The system in claim 1, further comprising multiple decoders, each decoder configured to receive an encoded broadcast frame from the encoder via a broadcast channel, and to return feedback information to the encoder.

39. The system in claim 38, wherein the decoders share one or more common feedback channels, with feedback information from each decoder being "personalized" to a respective decoder through use of decoder identification information included in the feedback information.

40. The system in claim 1 wherein the encoder is configured to use a different channel to transmit the second resolution frames or retransmit the portions of the first resolution frames than was used to transmit the corresponding first resolution fames.

\* \* \* \* \*